(12) United States Patent
Huang

(10) Patent No.: US 6,983,584 B1
(45) Date of Patent: Jan. 10, 2006

(54) GARDENING RAKE WITH IMPROVED STRUCTURE

(75) Inventor: Yao-Chung Huang, Chang Hua Hsien (TW)

(73) Assignee: Ho Cheng Garden Tools Co., Ltd., Fu Shing Hsiang (TW)

( * ) Notice: Subject to any disclaimer, the term of this patent is extended or adjusted under 35 U.S.C. 154(b) by 0 days.

(21) Appl. No.: 10/785,038

(22) Filed: Feb. 25, 2004

(51) Int. Cl.
*A01D 7/10* (2006.01)

(52) U.S. Cl. .................. 56/400.12; 56/400.21

(58) Field of Classification Search ............. 56/400.12, 56/400.01, 400.04, 400.06, 400.11, 400.16, 56/400.17; 294/51, 50.6–50.9, 58; 172/373–375
See application file for complete search history.

(56) References Cited

U.S. PATENT DOCUMENTS

| | | | | |
|---|---|---|---|---|
| 5,564,267 A | * | 10/1996 | Bricker et al. | ........... 56/400.12 |
| 5,901,540 A | * | 5/1999 | Vella | ...................... 56/400.12 |

* cited by examiner

*Primary Examiner*—Meredith Petravick
(74) *Attorney, Agent, or Firm*—Alan D. Kamrath; Nikolai & Mersereau, P.A.

(57) ABSTRACT

A gardening rake includes a grip, extended poles and rake head, of which the extended poles are provided at one end of the grip. The rake heads are mounted at the end of the extended poles and constructed of several spaced talons. The talons of rake heads are designed with a T-shape. Based upon this modified structure, the double-headed rake heads can grab or rake off foreign materials via the clamping devices, thus offering an ease-of-use.

1 Claim, 5 Drawing Sheets

GARDENING RAKE WITH IMPROVED STRUCTURE

FIELD OF THE INVENTION

The present invention relates generally to a gardening rake, and more particularly to a gardening rake which is designed with a T-shape and doubled-head.

BACKGROUND OF THE INVENTION

There are currently available a wide range of gardening tools for different gardening purposes. The present invention has modified a gardening tool of a rake head, which is generally used to clean out the leaves. Available in hooked heads of the same bending direction, the conventional rakes are used to grab or rake off foreign materials. However, when the industry has designed a rake head of two groups of clamping devices, this structural design is limited by the directional property, for the hook of the rake head bends towards a relative direction. Thus, it will bring inconvenience of grabbing and raking off the foreign materials.

Therefore, based upon the aforementioned disadvantages of typical gardening rakes, this industry shall assume the responsibility to make some innovations for a utility model.

BRIEF SUMMARY OF THE INVENTION

The present invention can offer an improved efficiency as detailed below:

1. To provide a gardening rake which is designed with a T-shape and doubled-head. This is a preferred option of this industry in conformity with the requirements of new patent.

2. Based upon a modified structure, the double-headed rake head can offer ease-of-use.

3. The gardening tools with clamping devices can grab or rake off foreign materials via the rake heads for a convenient usage.

DETAILED DESCRIPTION OF THE INVENTION

Figure 1:
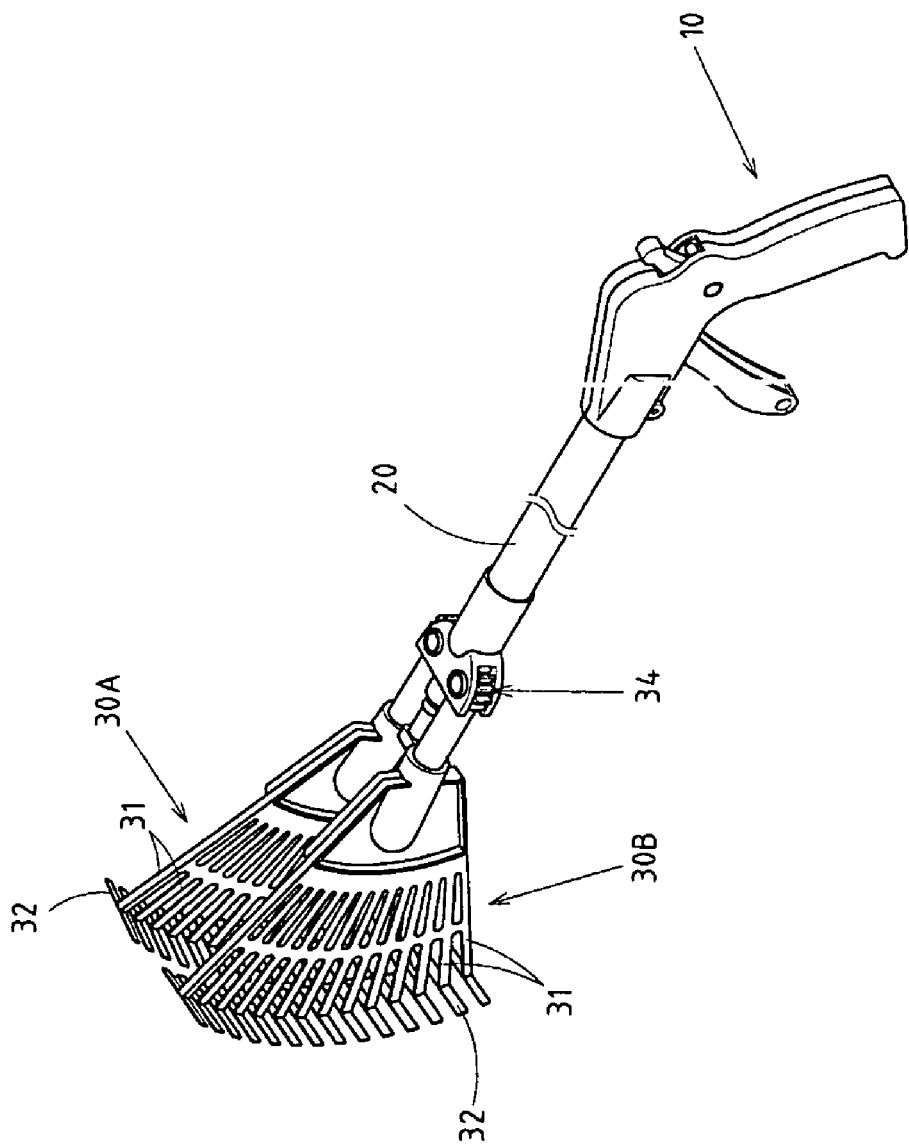
FIG. 1 shows a perspective view of the assembly of the present invention.
Figure 2:
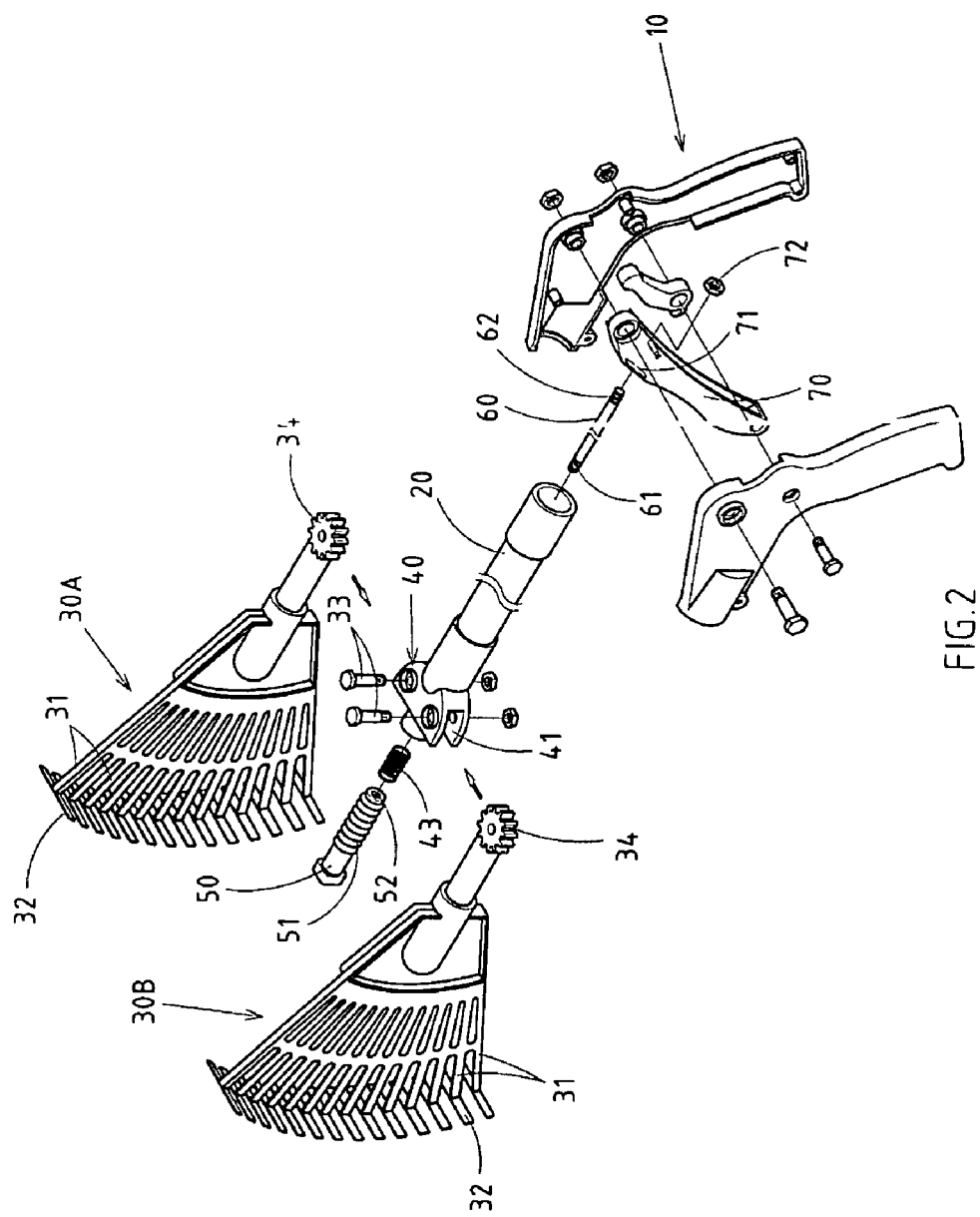
FIG. 2 shows an exploded view of the present invention.
Figure 3:
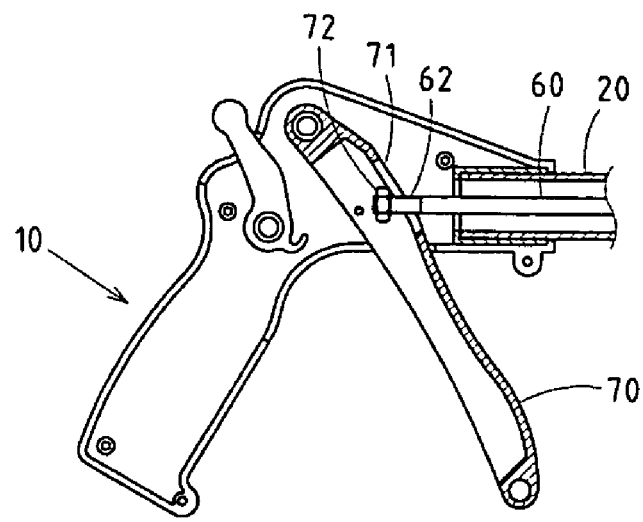
FIGS. 3–4 show cross-sectional view of the operating grip.
Figure 4:
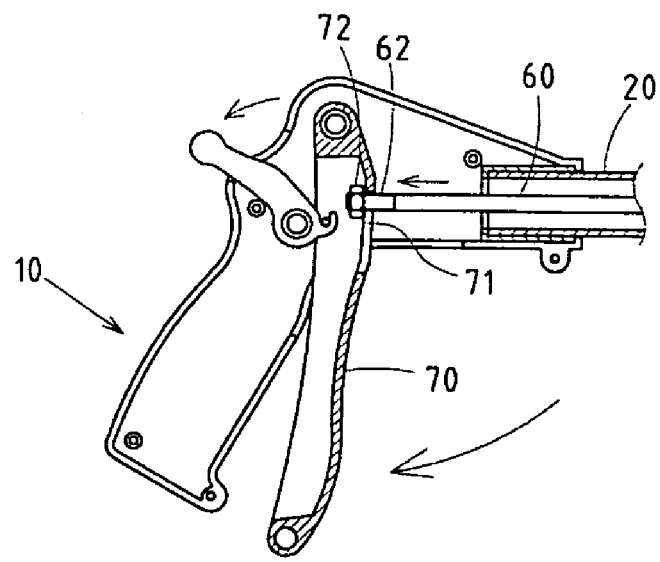

The features and the advantages of the present invention will be more readily understood upon a thoughtful deliberation of the following detailed description of a preferred embodiment of the present invention with reference to the accompanying drawings.

As shown in FIGS. 1–4, a gardening rake embodied in the present invention includes a grip 10, extended poles 20, is provided at one end of the grip 10, and rake heads 30A 30B, provided at the end of the extended poles 20 and constructed of several spaced talons 31. The talons 31 of the rake head 30A 30B are designed with T-shape heads 32. Of which, the rake head shall also be available with two groups of clamping mechanisms. And, a group of clamping device shall be applied to control the clamping or unfolding of the rake heads 30A 30B.

The clamping device includes a fixation base 40, which is provided at one end of the extended poles 20 of this gardening tool. It is applied to screw the connecting ends of rake heads 30A 30B onto left and right pivot notches 41 via the bolt 33. And, the connecting ends of rake heads 30A 30B are provided with gear wheels 34.

The clamping device also has a transmission mechanism 50, which is screwed into intermediate part between left and right pivot notches 41 of the fixation base 40. The transmission mechanism 50 has a rim 51 that gears into the gear wheel 34 of the connecting ends of rake heads 30A 30B. And, a spring 43 is placed between the inner side of the transmission mechanism 50 and one fixation wall 42 of the fixation base 40. Also, the inner side of the transmission mechanism 50 is mounted with a screw hole 52.

There is also a linkage bar 60, which is placed into the extended poles 20 of this gardening tool. The rear end of the linkage bar 60 is provided with a screw thread 61 that can be screwed into the screw hole 52 within above-mentioned transmission mechanism 50. And, the head end of the linkage bar 60 is provided with a screw end 62 that can extend to the grip 10 of this gardening tool.

Figure 5:
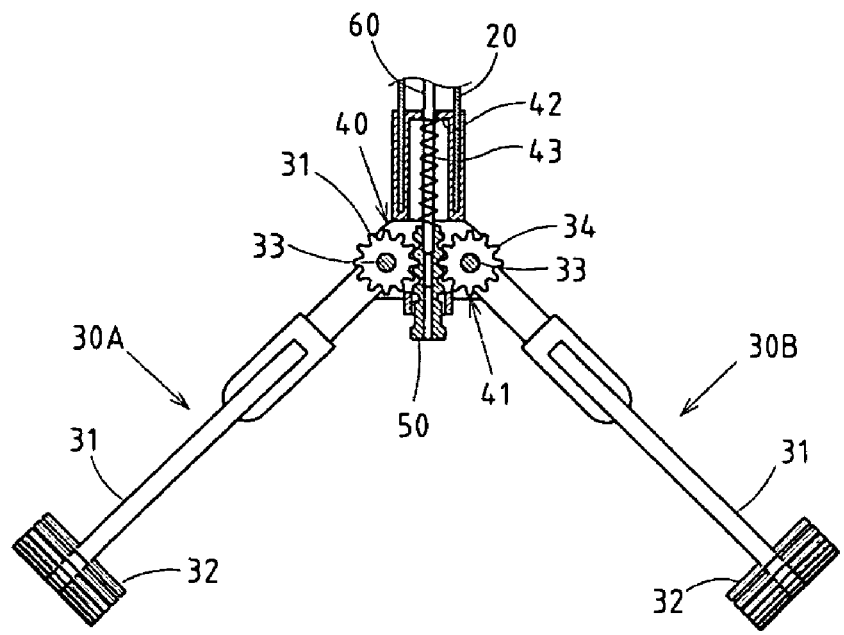
FIGS. 5–6 show cross-sectional view of the operating rake head.
Figure 6:
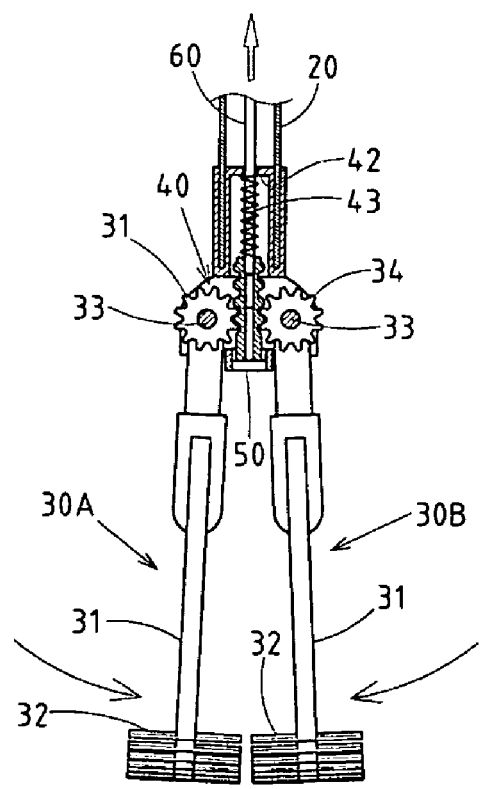

The invention also has a withhold handle 70, which is provided at the grip 10 of this gardening tool. The withhold end is mounted with an open hole 71 where the screw end of the linkage bar 60 can punch through. And, a screw nut 72 is used to fix the handle. Thereupon, the linkage bar 60 will be activated to shift towards the grip 10 when the withhold handle 70 is withheld. Meanwhile, the transmission mechanism 50 shall be activated by the linkage bar 60 so as to compress the spring 43 for recovery of its elasticity. And, two rake heads 30A 30B will clamp each other via the engagement of the rim 51 and gear wheel 34 (as shown in FIG. 6), On the contrary, when the end-user loosens his pressing upon the withhold handle 70, the transmission mechanism 50 will return to the end due to the released elasticity of the spring 43. Then, two rake heads 30A 30B will be released to an expanded state as a result of the engagement of rim 51 and gear wheel 34 (as shown in FIG. 5). As various talons 31 of the rake head are specifically designed with T-shape head 32 in the present invention, the meshed rake heads 30A 30B can surely wrap the leaves. Moreover, in the case of clamping state for rake heads 30A 30B, T-shape head 32 can be used to grab or rake off leaves more conveniently.

Figure 7:
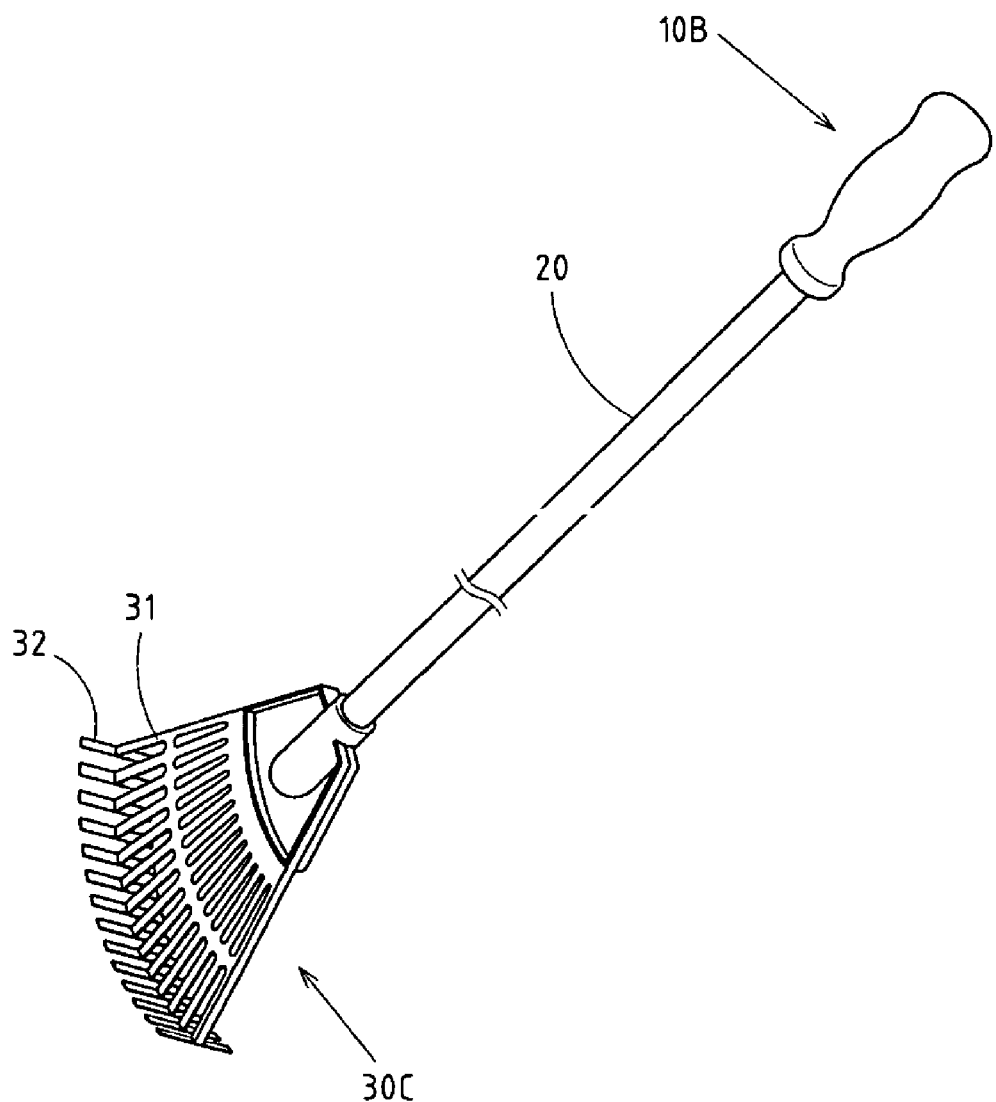
FIG. 7 shows a perspective view of another example of the rake head.

As shown in FIG. 7, the rake head 30C shall also be available with a single-component structure. Based upon the modified T-shape head 32 of various talons 31 of rake head 30C, the double-headed rake head 30C can offer ease-of-use. Besides, a simplified grip 10B without withhold handle is also applicable.

I claim:

1. A gardening rake comprising:
   a grip;
   an extended pole having a first end mounted on the grip;
   two rake heads each having a first end mounted on a second end of the extended pole and provided with a gear wheel and a second end provided with a plurality of spaced talons each provided with a T-shaped head;
   a clamping device mounted between the extended pole and the rake heads to control clamping or unfolding of the rake heads and including:

a fixation base mounted on the second end of the extended pole and having a pivot notch for mounting the gear wheel of each of the rake heads;

two bolts each extended through the fixation base and the gear wheel of a respective one of the rake heads so that the gear wheel of each of the rake heads is pivotally mounted on the fixation base;

a transmission mechanism extended through the pivot notch of the fixation base and having a rim that gears into the gear wheel of each of the rake heads, wherein the transmission mechanism has an inner side formed with a screw hole;

a spring mounted between the inner side of the transmission mechanism and a fixation wall of the fixation base;

a withhold handle mounted on the grip and having an open hole;

a linkage bar mounted in the extended pole and having a first end provided with a screw head screwed into the screw hole of the transmission mechanism and a second end provided with a screw end extended through the open hole of the withhold handle into the withhold handle;

a screw nut mounted in the withhold handle and screwed onto the screw end of the linkage bar to fix the linkage bar on the withhold handle.

* * * * *